United States Patent Office 3,420,832
Patented Jan. 7, 1969

---

3,420,832
1,5-DIAZABICYCLO[4.3.0]NONANES
William J. Houlihan, Mountain Lakes, N.J., assignor to Sandoz Inc., Hanover, N.J.
No Drawing. Filed Nov. 25, 1966, Ser. No. 596,806
U.S. Cl. 260—250                3 Claims
Int. Cl. C07d 57/22; C07d 51/04

This invention relates to bicyclic compounds. In particular, the invention pertains to 1,5-diazabicyclo[4.3.0] nonanes and a method for preparing the same. The invention also relates to intermediates which are useful in preparing the above compounds and methods for preparing said intermediates.

The diazabicyclononanes of the present invention may be represented structurally as follows:

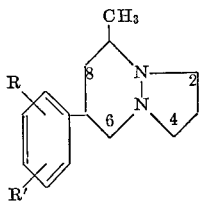

wherein

R is in one of the positions 2-, 3- or 4- and is either hydrogen; lower alkyl, preferably containing from 1 to 4 carbon atoms, e.g., methyl, ethyl, propyl and butyl; lower alkoxy, preferably containing from 1 to 4 carbon atoms, e.g., methoxy, ethoxy, propoxy and butoxy; chloro; fluoro; or trifluoromethyl;

R' is in one of the available positions 2-, 3- or 4- and is either hydrogen; lower alkyl, preferably containing from 1 to 4 carbon atoms, e.g., methyl, ethyl, propyl and butyl; lower alkoxy, preferably containing from 1 to 4 carbon atoms, e.g., methoxy, ethoxy, propoxy and butoxy; chloro; fluoro; or trifluoromethyl; or R and R' together form a 2,3- or 3,4-methylenedioxy bridge.

The compounds of structural Formula I are prepared by reacting an α-phenyllevulinic acid with 3-hydrazinopropanol to form the corresponding 2-(3-hydroxypropyl)-6 - methyl-4-phenyl-4,5-dihydropyridazin(2H)-3-one, reducing the latter to form the corresponding 1-(3-hydroxypropyl)-3-methyl-5-phenyl-hexahydropyridazine and then converting the latter to the corresponding 9-methyl-7-phenyl-1,5-diazabicyclo[4.3.0]nonane. This process may be illustrated structurally as follows:

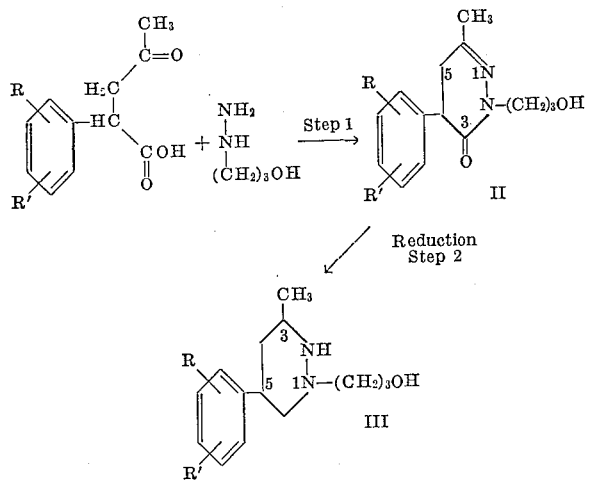

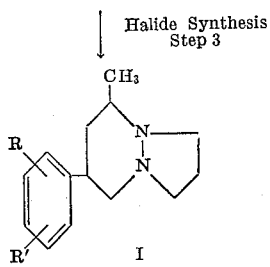

wherein R and R' are as previously defined.

As illustrated above, Step 1 of the process involves the reaction of an α-phenyllevulinic acid with 3-hydrazinopropanol to form the corresponding 2-(3-hydroxypropyl)-6-methyl-4-phenyl-4,5-dihydropyridazin(2H)-3-one (II). This reaction is conveniently carried out in the presence of an inert organic solvent and at elevated temperatures. However, neither the solvent nor the temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an alkyl or arylsulfonic acid, e.g., methanesulfonic acid, benzenesulfonic acid and p-toluenesulfonic acid. The resulting product (II) can be readily isolated employing conventional techniques.

The reduction (Step 2) of the pyridazinone (II) to the corresponding pyridazine (III) is readily carried out employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at an elevated temperature, preferably reflux temperature. Suitable solvents include the ethers, such as diethyl ether and tetrahydrofuran. However, neither the solvent nor temperature employed is critical. The resulting product (III) is readily recovered in conventional manner.

Step 3 of the process involves the conversion of the pyridazine (III) to the corresponding diazabicyclononane (I) via halide synthesis and spontaneous ring closure. This is accomplished in standard manner employing any of the conventional agents used for this purpose. The preferred agent, however, is thionyl chloride. The reaction is conveniently carried out in any suitable inert organic solvent, e.g., methylene chloride, chloroform and carbon tetrachloride, and at room temperature or elevated temperatures up to reflux temperature. Preferably, the reaction is carried out at the reflux temperature of the system. The resulting product is readily recovered in conventional manner.

Various of the levulinic acids employed in Step 1 of the process are known and can be prepared as described in the literature. Such others which are not specifically disclosed in the literature may be readily prepared from available materials by methods analogous to those described in the literature for the preparation of the known compounds.

All of the compounds of structural Formulas I and III have asymmetric centers and therefore exist as geometric and optically active isomers. Separation and recovery of the respective isomers may be readily accomplished employing conventional techniques and such isomers are included within the scope of this invention.

The end compounds of the present invention in their free base form (Formula I) are useful because they possess pharmacological activity in animals. In particular, such compounds are central nervous system stimulants and can be used as anti-depressants. For such use, the compounds may be combined with a pharmaceutically acceptable carrier, and such other adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate and the like.

As noted above, the compounds of Formula I exist as geometric and optical isomers. In some cases greater pharmacological activity or other beneficial attribute may be found with respect to a particular isomer, and in such instances administration of such isomers may be preferred.

The dosage administered will, of course, vary depending on the compound employed and mode of administration. However, in general satisfactory results are obtained when administered at a daily dosage of from about 15 milligrams to about 30 milligrams per kilogram of animal body weight, preferably given in divided doses, 2 to 4 times a day, or in sustained release form. For both the larger mammals and smaller domestic mammals dosage forms suitable for internal administration comprise from about 100 milligrams to about 400 milligrams of the compound admixed with a solid or liquid pharmaceutical carrier or diluent.

A representative formulation is a tablet (prepared by standard tabletting techniques) and containing the foling ingredients:

| Ingredient: | Parts by wt. |
|---|---|
| 9 - methyl - 7 - phenyl - 1,5 - diazabicyclo- [4.3.0]nonane hydrochloride | 40 |
| Tragacanth | 2 |
| Lactose | 49.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

9-methyl-7-phenyl-1,5-diazabicyclo[4.3.0]nonane

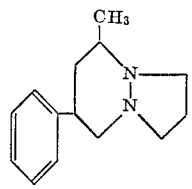

Step A.—Preparation of 2-(3-hydroxypropyl)-6-methyl-4-phenyl-4,5-dihydropyridazin(2H)-3-one To a flask equipped with a condenser, Dean-Stark tube and stirrer is added 40.0 g. of α-phenyllevulinic acid, 20.5 g. of 3-hydrazinopropanol and 500 ml. of toluene. The mixture is stirred and refluxed until water ceases to separate in the Dean-Stark tube. The organic phase is separated and washed first with 100 ml. of 2 N hydrochloric acid, then with 100 ml. of 2 N sodium hydroxide and finally with 100 ml. of a saturated solution of sodium chloride. The washed organic phase is then evaporated in vacuo to obtain 2-(3-hydroxypropyl)-6-methyl-4-phenyl-4,5-dihydropyridazin(2H)-3-one as a viscous oil.

Step B.—Preparation of 1-(3-hydroxypropyl)-3-methyl-5-phenyl-hexahydropyridazine To a flask equipped with a stirrer, condenser, gas inlet tube and Soxhlet tube containing 37 g. of 2-(3-hydroxypropyl) - 6 - methyl - 4 - phenyl - 4,5 - dihydropyridazin- (2H)-3-one is added under nitrogen atomsphere 10.6 g. of lithium aluminum hydride and 200 ml. of absolute diethyl ether. The contents of the flask are stirred and refluxed for 25 hours and then cooled in an ice bath. To the cooled mixture is added dropwise 21.2 ml. of 2 N sodium hydroxide and 31.8 ml. of water. The resulting mixture is then filtered and the filtrate concentrated on a rotary evaporator to obtain 1-(3-hydroxypropyl)-3-methyl-5-phenyl-hexahydropyridazine as a viscous oil.

Step C.—Preparation of 9-methyl-7-phenyl-1,5-diazabicyclo[4.3.0]nonane

To a flask equipped with a condenser and stirrer is added 32.4 g. of 1-(3-hydroxypropyl)-3-methyl-5-phenyl-hexahydropyridazine, 400 ml. of chloroform and 24.6 g. of thionyl chloride. The resulting mixture is stirred and refluxed for 24 hours. The solution thus obtained is washed first with 10% sodium carbonate solution until the wash is alkaline and then with 100 ml. of a saturated solution of sodium chloride. The organic phase is then evaporated in vacuo to obtain crude 9-methyl-7-phenyl-1,5 - diazabicyclo[4.3.0]nonane, B.P. 145–162° C./0.6–0.7 mm.

The free base is dissolved in diethyl ether, the resulting solution treated with hydrogen chloride gas and the resulting solid material filtered off to obtain 9-methyl-7-phenyl-1,5-diazabicyclo[4.3.0]nonane hydrochloride, M.P. 100–103° C.

EXAMPLE 2

Following the procedure of Step A of Example 1 and employing an equivalent amount of the reactants enumerated below in place of the α-phenyllevulinic acid used therein, there are obtained the products set forth below:

| Reactant | Product |
|---|---|
| (a) α-(p-tolyl)levulinic acid | (a) 2-(3-hydroxypropyl)-6-methyl-4-(p-tolyl)-4,5-dihydropridazin(2H)-3-one. |
| (b) α-(2,4-dimethylphenyl) levulinic acid. | (b) 4-(2,4-dimethylphenyl)-2-(3-hydroxypropyl)-6-methyl-4,5-dihydropyridazin (2H)-3-one. |
| (c) α-(o-methoxyphenyl) levulinic acid. | (c) 2-(3-hydroxypropyl)-4-(o-methoxyphenyl)-6-methyl-4,5-dihydropyridazin(2H)-3-one. |
| (d) α-(3,4-dimethoxyphenyl) levulinic acid. | (d) 4-(3,4-dimethoxyphenyl)-2-(3-hydroxypropyl)-6-methyl-4,5-dihydropryridazin(2H)-3-one. |
| (e) α-(p-fluorophenyl)levulinic acid. | (e) 4-(p-fluorophenyl)-2-(3-hydroxypropyl)-6-methyl-4,5-dihydropyridazin(2H)-3-one. |
| (f) α-(o-chlorophenyl)levulinic acid. | (f) 4-(o-chlorophenyl)-2-(3-hydroxypropyl)-6-methyl-4,5-dihydropyridazin(2H)-3-one. |
| (g) α-(p-trifluoromethylphenyl)levulinic acid. | (g) 2-(3-hydroxypropyl)-6-methyl-4-(p-trifluoromethylphenyl)-4-5-dihydropyridazin(2H)-3-one. |
| (h) α-(3,4-dichlorophenyl) levulinic acid. | (h) 4-(3,4-dichlorophenyl)-2-(3-hydroxypropyl)-6-methyl-4,5-dihydropyridazin(2H)-3-one. |
| (i) α-(2,3-methylenedioxyphenyl)levulinic acid. | (i) 2-(3-hydroxypropyl)-6-methyl-4-(2,3-methylenedioxyphenyl)-4,5-dihydropyridazin(2H)-3-one. |
| (j) α-(3,4-methylenedioxyphenyl)levulinic acid. | (j) 2-(3-hydroxypropyl)-6-methyl-4-(3,4-methylenedioxyphenyl)-4,5-dihydropyridazin(2H)-3-one. |

EXAMPLE 3

Following the procedure of Step B of Example 1 and employing an equivalent amount of the products of Example 2 in place of the 2-(3-hydroxypropyl)-6-methyl-4-phenyl-4,5-dihydropyridazin(2H)-3-one used in Step B of Example 1, there are obtained the hexahydropyridazines set forth below:

(a) 1 - (3 - hydroxypropyl) - 3 - methyl - 5 - (p - tolyl) - hexahydropyridazine (b) 5 - (2,4 - dimethylphenyl) - 1 - (3 - hydroxypropyl) - 3-methyl-hexahydropyridazine
(c) 1 - (3 - hydroxypropyl) - 5 - (o - methoxyphenyl) - 3-methyl-hexahydropyridazine
(d) 5 - (3,4 - dimethoxyphenyl) - 1 - (3 - hydroxypropyl)-3-methyl-hexahydropyridazine
(e) 5 - (p - fluorophenyl) - 1 - (3 - hydroxypropyl) - 3 - methyl-hexahydropyridazine
(f) 5 - (o - chlorophenyl) - 1 - (3 - hydroxypropyl) - 3 - methyl-hexahydropyridazine
(g) 1 - (3 - hydroxypropyl) - 3 - methyl - 5 - (p - trifluoromethylphenyl)-hexahydropyridazine
(h) 5 - (3,4 - dichlorophenyl) - 1 - (3 - hydroxypropyl) - 3-methyl-hexahydropyridazine
(i) 1 - (3 - hydroxypropyl) - 3 - methyl - 5 - (2,3 - methylenedioxyphenyl)-hexahydropyridazine
(j) 1 - (3 - hydroxypropyl) - 3 - methyl - 5 - (3,4 - methylenedioxyphenyl)-hexahydropyridazine.

EXAMPLE 4

Following the procedure of Step C of Example 1 and employing an equivalent amount of the hexahydropyridazines of Example 3 in place of the 1-(3-hydroxypropyl)-3-methyl-5-phenyl-hexahydropyridazine used in Step C of Example 1, there are obtained the diazabicyclononanes set forth below:

(a) 9-methyl-7-(p-tolyl) - 1,5-diazabicyclo[4.3.0]nonane
(b) 7 - (2,4 - dimethylphenyl) - 9 - methyl - 1,5 - diazabicyclo[4.3.0]nonane
(c) 7 - (o - methoxyphenyl) - 9 - methyl - 1,5 - diazabicyclo[4.3.0]nonane
(d) 7 - (3,4 - dimethoxyphenyl) - 9 - methyl - 1,5 - diazabicyclo[4.3.0]nonane
(e) 7 - (p - fluorophenyl) - 9 - methyl - 1,5 - diazabicyclo[4.3.0]nonane
(f) 7 - (o - chlorophenyl) - 9 - methyl - 1,5 - diazabicyclo[4.3.0]nonane
(g) 9 - methyl - 7 - (p - trifluoromethylphenyl) - 1,5 - diazabicyclo[4.3.0]nonane
(h) 7 - (3,4 - dichlorophenyl) - 9 - methyl - 1,5 - diazabicyclo[4.3.0]nonane
(i) 9 - methyl - 7 - (2,3 - methylenedioxyphenyl) - 1,5 - diazabicyclo[4.3.0]nonane
(j) 9 - methyl - 7 - (3,4 - methylenedioxyphenyl) - 1,5 - diazabicyclo[4.3.0]nonane.

What is claimed is:
1. A compound selected from the group consisting of diazabicyclononanes of the formula

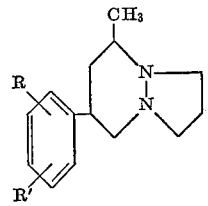

and the non-toxic pharmaceutically acceptable salts thereof,
wherein
R is in one of the positions 2-, 3- or 4- and represents hydrogen, lower alkyl, lower alkoxy, chloro, fluoro or trifluoromethyl;
R' is in one of the available positions 2-, 3- or 4- and represents hydrogen, lower alkyl, lower alkoxy, chloro, fluoro or trifluoromethyl; or
R and R' together form a 2,3- or 3,4-methylenedioxy bridge.

2. The compound of claim 1 which is 9-methyl-7-phenyl-1,5-diazabicyclo[4.3.0]nonane.

3. The compound of claim 1 which is 9-methyl-7-phenyl-1,5-diazabicyclo[4.3.0]nonane hydrochloride.

References Cited

UNITED STATES PATENTS 2,832,780   4/1958   King _____ 260—250

ALTON D. ROLLINS, Primary Examiner.

R. V. RUSH, Assistant Examiner.

U.S. Cl. X.R.

260—521, 340.5; 424—250